Aug. 5, 1969  J. A. CHERNAK ET AL  3,459,345
VALVE
Filed May 26, 1967  2 Sheets-Sheet 2
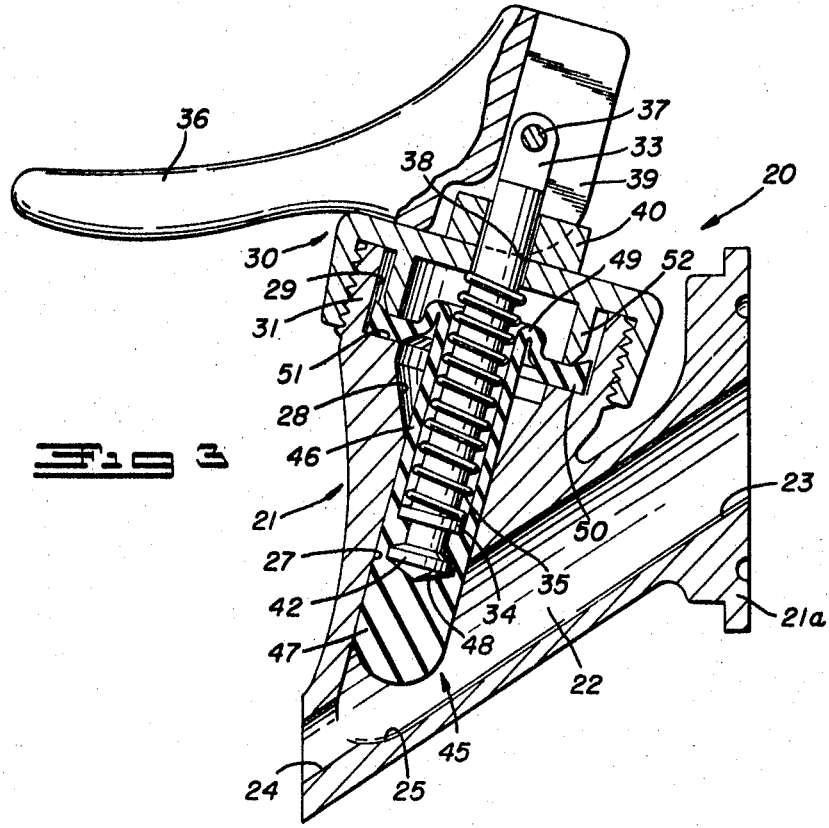
INVENTORS
JOHN A. CHERNAK &
ELROY J. GIESE
BY
Fray, Sharpe &
Mulholland
ATTORNEYS

United States Patent Office 3,459,345
Patented Aug. 5, 1969

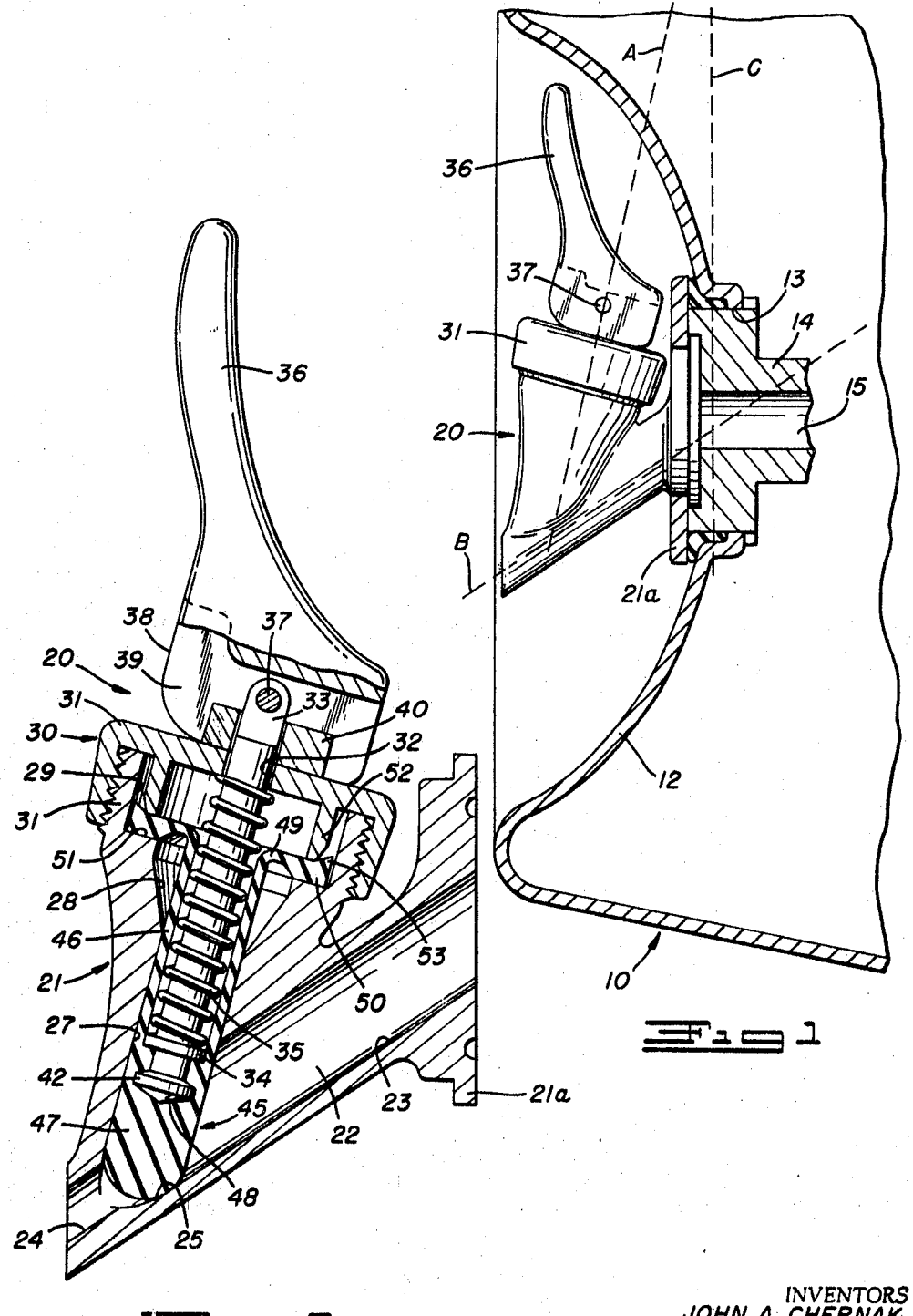

3,459,345
VALVE
John A. Chernak, Lyndhurst, and Elroy J. Giese, Cleveland, Ohio, assignors to Tomlinson Industries, Inc., Cleveland, Ohio, a corporation of Ohio
Filed May 26, 1967, Ser. No. 641,513
Int. Cl. B67d 1/14, 1/16; F16k 1/30
U.S. Cl. 222—505                                                         9 Claims

ABSTRACT OF THE DISCLOSURE

A valve or tap for use with a beer keg or other liquid-containing reservoir with the valve being disposed in a restricted space such as the chime of the keg. The valve body is disposed at an angle to the chime and has an outlet passageway intersected by a sealing passageway at a point proximate the exterior end of the outlet passageway. Construction of the valve is such that upon attachment to the reservoir, the entire valve will be contained within the space defined by the chime and the plane of the peripheral edge of the keg.

BACKGROUND OF THE INVENTION

A beer keg, especially one constructed of metal (for example, aluminum) is generally circular in cross section and has end walls which are of concave configuration thereby forming what the keg art terms a "chime." Concave configurations of the faces facilitates handling and storage of the kegs. It permits vertical stacking of the kegs as well as horizontal arrangement in a face-to-face relation. In either of these positions, the kegs wil contact each other only at the peripheral edge of the chime or concave face.

In recent years, the idea of supplying miniature kegs of a size compatible with the space limitations of a home refrigerator has gained acceptance by the beer-consuming public. Extension of this concept to other carbonated beverages may also be forthcoming. The use of such kegs in the home, however, requires that the keg be permanently tapped, before sale, with a suitable tap or valve. Such a valve must meet at least three requirements to be of any practical use in the home. Initially, the entire valve must be contained within the space between the plane of the peripheral edge of the keg and the concave face or chime of the keg. The storage and handling considerations noted above significantly contribute to this requirement. Further, the placement of the new smaller kegs in the home refrigerator demands conservation of space and therefore a valve or tap extending beyond the boundaries of the keg would be extremely undesirable. A second requirement demands that despite the limited space available between the outlet passage of the valve and the keg chime the valve or tap outlet be convenient to the placement of a container, for example, a beer glass, mug or stein. A third requirement of the valve is the avoidance of after-drip. That is, after the beer stein has been filled and the valve is closed, liquid must not be trapped in the outlet and subsequently drip therefrom. Drippage of beer, for example, in a home refrigerator can cause obvious disadvantages including pungent odors.

Prior attempts to devise workable solutions to the problems and requirements noted have failed because of the inability to produce a valve having a construction capable of dependable performance under the close dimensions and limits imposed by the keg structure and environment.

This invention, however, provides an efficient valve for permanent attachment to a beer keg or any other liquid-containing reservoir, especially such a reservoir having space limitations resulting from structural restrictions similar to those previously mentioned.

SUMMARY OF THE INVENTION

To provide a solution to the space restrictions of a reservoir having its tapped face concavously recessed, this invention contemplates a valve body extending outwardly and transversely of the horizontal axis of the keg. Retention of flow control with this construction is also permitted by constructing the valve with intersecting outlet and closure passageways whereby the outlet passageway is closed immediately proximate its opening to the atmosphere. This outlet sealing construction in combination with the angle of the valve body also prevents any after-drip or any drainage of fluid when the valve is in the closed position.

The tilt of the valve also facilitates access to the valve outlet by a glass, mug, etc. This construction, in fact, makes tilting of a glass, to position an edge thereof behind the outlet and in front of the keg chime, not only effortless but also conducive to drawing the liquid from the reservoir in the proper manner.

This invention provides a valve for use with any liquid reservoir. It is particularly useful with a reservoir having a generally keg-like structure and at least one concavously recessed face or chime. The valve body is adapted to be attached at approximately the midsection of the keg face. The valve body extends transversely to the horizontal and vertical axes of the reservoir and face, yet remains inwardly of the plane of the peripheral edge of the keg. The valve body has a downwardly directed outlet passageway which is in communication with the contents of the reservoir by means of an inlet passageway extending from the reservoir into the valve body. Reciprocating closure means are also disposed in the valve body and adapted to open and close the outlet passageway proximate its most downward end. A cam-action handle is provided to actuate the closure means and properly control the size of the outlet opening and therefore the flow rate.

In the drawings:

FIG. 1 is a perspective view of the valve partly in section attached to a liquid-containing reservoir;

FIG. 2 is a side elevational section of the valve in the closed portion;

FIG. 3 is a side elevational section of the valve in the open position.

In FIG. 1 of the drawings the liquid-containing reservoir or keg 10 is shown having a concavously recessed face or end wall 12 defining the chime of the keg. Intermediate the end wall 12 and preferably at the mid-section thereof is provided an opening 13. A plug or bung 14 is received in opening 13 with a passage 15 in the bung to provide communication between the exterior and interior of the keg.

Attached to the bung 14 is a valve, indicated generally by the reference numeral 20, which controls the flow of fluid through the passage 15 and permits selective dispensation of the fluid.

Referring more particularly to FIG. 2 the valve 20 comprises a body 21 having a valve attachment flange 21a and a through passage 22 divided into an inlet portion 23 and an outlet portion 24. A sealing seat 25 is defined at the junction of the outlet portion 24 and the inlet portion 23 with the seat being defined by the tapered construction of the side wall of the passage 22 as it narrows from the large diameter of the inlet passage 23 to the smaller diameter of the outlet passage 24. Angularly disposed to the passage 22 in the body 21 is a cylindrical portion 27 which merges into a frusto conical portion 28 and thence into an enlarged cylindrical portion 29. The portions 27, 28 and 29 cooperate to define a seal receiving chamber. A threaded cap assembly 30 is threaded over the outer periphery of the body at its upper extremety 31.

The cap assembly comprises a bonnet member 31 having a central opening 32 through which projects one end of a stem means 33. The stem means has a radial collar 34 which provides an abutment for one end of a compression spring 35 which surrounds the stem 33. The other end of the spring 35 abuts the inner surface of the bonnet member 31 thereby normally urging the stem means 33 toward the valve seat 25. A handle 36 is attached to the stem by suitable pivot means 37 with the handle including arcuate cam portions 38 formed on spaced apart runners 39. The bonnet member includes an upstanding boss 40 through which the end of the stem means 33 also projects. The boss 40 is disposed between the bifurcated runners 39 on the handle 36 and the flat sides of the boss cooperate with the runners to prevent rotation of the handle relative to the bonnet member.

Disposed in the seal chamber and received over the lower end of the stem means 33 is a flexible seat cup of suitable elastomer and indicated generally by the reference numeral 45. The seat cup includes an essentially elongated tubular nipple portion 46 having a transverse end wall 47 with the free end of the end wall having a rounded configuration adapted to cooperate with the tapered valve seat 25. A recess 48 is formed in the end wall 47 and is adapted to be removably snap fitted on a knob 42 formed on the end of the stem 33. The seat cup 45 further includes a flexible transverse shoulder portion 49 which merges into a thickened cylindrical base section 50. As is apparent from FIG. 2, the base portion 50 is received in the cylindrical portion 29 in the valve body with the base portion resting on the transverse shoulder 51 at the juncture of the cylindrical portion 29 and the frusto-conical portion 28. The bonnet member 31 includes an axially projecting expander 52 in the form of an annular flange which opposes the transverse shoulder 51 and clamps the base portion 50 against the shoulder 51. An annular ridge or rim 53 is formed on the upper peripheral surface of the base portion 50 with this rim 53 preventing slippage of the base portion 50 radially inward of the expander 52 as the seat cup is flexed.

The valve 20 may be assembled to the beer keg 10 in the manner shown in FIG. 1 with the dimensions and construction of the valve 20 being such that the valve, when assembled to the bung 14, lies entirely within the confines of the chime of the keg thus permitting the kegs to be stacked one on top of the other without the valve causing interference between the kegs. It will be understood that the valve 20 may be formed with the bung 14 as an integral part of the valve in lieu of the flange 21a but the important requirement that the valve lie entirely within the chime of the keg must be observed.

There are several specific relationships between the valve and the keg which should be noted. The longitudinal axis of the fluid passageway 22 in the valve body (line B in FIG. 1) forms an obtuse angle with the passage 15 in the bung 14. This angular relationship avoids what is known in the art as cutting or cavitation of the fluid as it is dispensed. Morever, because of the angular disposition of the passage 22 and the proximity of the end wall 12, the placement of a glass beneath the outlet portion 24 will, of necessity, cause the fluid as it is dispensed to impinge on the side of the glass thereby preventing undue foaming of the dispensed liquid.

Another angular relationship which should be noted is that between the axis of the stem means 33 and the plane of the opening 13 in the end wall 12. Thus, as shown in FIG. 1, a line A drawn along the longitudinal axis of the stem means 33 intersects the plane of the opening 13 (line C) to form an acute angle. This relationship may also be expressed with reference to the flange 21a which lies in a plane that intersects line A to form an acute angle. With this relationship the handle 36 is positioned inwardly of the outer peripheral edge of the chime of the keg and yet permits the operator to grasp the handle and actuate the valve. As a general proposition the line A drawn along the axis of the stem means 33 ordinarily will intersect the end wall 12 of the keg approximately at mid point between the opening and the periphery of the keg. However, it will be appreciated that this relationship may vary with the precise details of the valve and the intersection of line A with the end wall may occur at a point other than mid point.

An acute angle is also formed between the line A and the longitudinal axis (line B) of the passageway 22. With this arrangement, the handle 36 is disposed well within the confines of the chime of the keg but yet seals the passageway 22 at a point adjacent the outer extremity of the passageway. This relationship contributes to preventing after drip since fluid cannot be trapped in the passageway when the valve is closed.

It is believed apparent that the above described valve provides, in combination with the small kegs now available for home use, a satisfactory arrangement both from the standpoint of space limitations and from the standpoint of proper dispensing of the liquid. Thus the angular relationships noted above not only assure that the valve is entirely disposed within the chime of the keg but also avoids foaming of the liquid and permits the shut off of the valve to be at the discharge end of the flow passage thereby avoiding after-drip.

We claim:
1. A valve for dispensing liquids comprising:
a valve body with a fluid passage therethrough;
said fluid passage having an inlet portion and an outlet portion;
the outlet portion of said passage including a smoothly tapering portion defining a valve seat, said valve seat being located in close proximity to the outer end of the outlet portion in order to reduce after-drip of the liquid when the valve is closed;
an upwardly opening seal chamber in said body;
bonnet means on said body closing said seal chamber;
straight stem means in said seal chamber with one end extending through an opening in said bonnet and the other end being opposed to said valve seat;
stem actuating means on said valve body secured to said one end of said stem means and being operable to displace said other end of said stem means toward and away from said seat;
flexible sealing means received over said other end of said stem means;
said bonnet means cooperating with said body to secure the upper end of said sealing means against movement relative to said body;
the lower end of said sealing means being configured to engage and cooperate with said valve seat to control the flow of fluid through said passage;
said stem actuating means including a handle and spaced apart runners formed thereon in engagement with said bonnet means for rocking movement relative to said bonnet means; and
boss means on said bonnet means between said runners for preventing rotation of said handle about the longitudinal axis of said stem means.

2. The valve of claim 1 wherein said valve body further includes valve mounting means for securing said valve to a fluid reservoir;
the longitudinal axis of said seal chamber and said straight stem forming an acute angle with the plane of said valve mounting means.

3. The valve of claim 1 wherein said seal chamber and said straight stem intersect said fluid passage to define an acute angle therebetween.

4. The valve of claim 2 wherein said seal chamber and said straight stem intersect said fluid passage to define an acute angle therebetween.

5. The valve of claim 1 in combination with a fluid reservoir in which the reservoir has at least one concavously recessed end wall and a central opening in the end wall;
> said valve being secured to said end wall in said central opening;
> said valve being so dimensioned and configured as to lie entirely within the recess defined by said concavously recessed end wall with said handle spaced from said end wall and said outlet portion of said valve being spaced from said end wall.

6. The combination of claim 5 wherein the longitudinal axis of said stem means intersects the plane of said central opening in said reservoir to form an acute angle therebetween.

7. In combination, a reservoir for liquids, said reservoir having at least one concavously recessed end wall and a central opening in the end wall;
> a valve in said central opening for controlling the flow of fluid therethrough;
> said valve including a valve body with a fluid passage therethrough;
> said fluid passage having an inlet portion and an outlet portion;
> the outlet portion of said passage including a smoothly tapering portion defining a valve seat, said valve seat being located in close proximity to the end of the outlet portion;
> an upwardly opening seal chamber in said valve body;
> bonnet means on said body closing said seal chamber;
> straight stem means in said seal chamber with one end of said stem means extending through an opening in said bonnet and the other end being opposed to said valve seat;
> stem actuating means on said valve body secured to said one end of said stem means and being operable to displace said other end of said stem means toward and away from said valve seat;
> flexible sealing means received over said other end of said stem means;
> said bonnet means cooperating with said body to secure the upper end of said sealing means against movement relative to said body;
> the lower end of said sealing means being secured to said stem means and configured to engage and cooperate with said valve seat to control the flow of fluid through said fluid passage;
> the longitudinal axis of said stem means intersecting the end wall of said reservoir intermediate the outer extremity of the concavity and the central opening and also intersecting the plane of the central opening to define an acuate angle therebetween.

8. The combination of claim 7 wherein said valve further includes boss means on said bonnet means;
> said stem actuating means including a handle with runner means formed thereon in engagement with said bonnet means;
> said boss means cooperating with said runner means for preventing rotation of said handle about the longitudinal axis of said stem means;
> said bonnet means having a depending flange which engages the upper end of the sealing means and secures it in a fluid-tight relationship with the valve body.

9. The combination of claim 8 wherein said seal chamber and said straight stem intersect said fluid passage to define an acute angle therebetween.

References Cited

UNITED STATES PATENTS

| | | | |
|---|---|---|---|
| 2,188,216 | 1/1940 | Beecher | 251—331 |
| 2,955,616 | 10/1960 | Jarrett et al. | 251—331 |
| 3,207,472 | 9/1965 | Seltsam | 251—331 |
| 3,301,525 | 1/1967 | Chernak et al. | 251—331 |

FOREIGN PATENTS

| | | |
|---|---|---|
| 17,077 | 9/1895 | Great Britain. |

WALTER SOBIN, Primary Examiner

U.S. Cl. X.R.

222—518, 559; 251—331